Sept. 17, 1940.   C. B. WILCOX   2,215,414
DEFROSTING SYSTEM
Filed Feb. 7, 1939
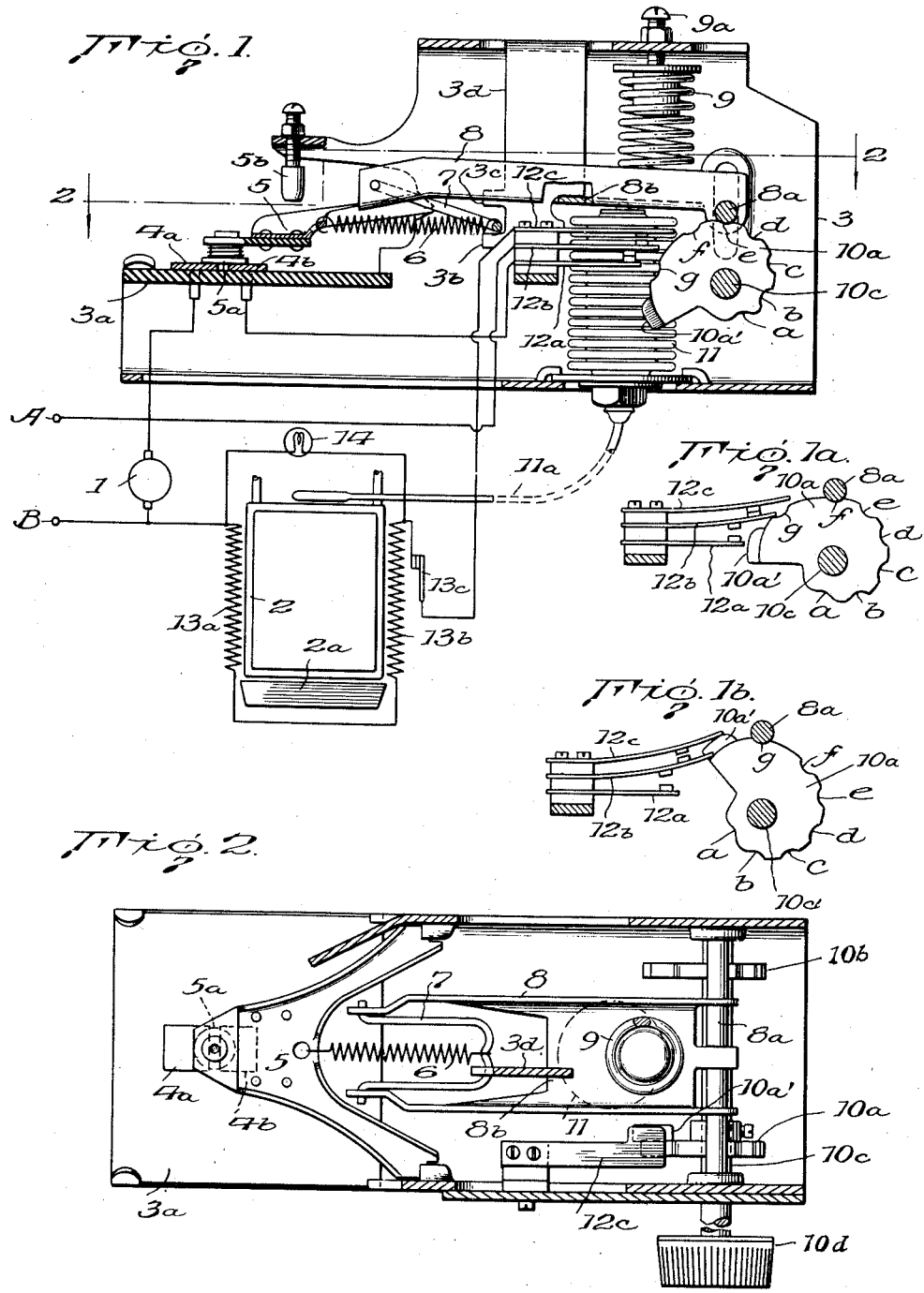
Inventor
Charles B. Wilcox,
By Ralph B. Stewart
Attorney Patented Sept. 17, 1940

2,215,414

UNITED STATES PATENT OFFICE 2,215,414

DEFROSTING SYSTEM

Charles B. Wilcox, Mount Rainier, Md., assignor of one-half to Edgar Morris, Washington, D. C.

Application February 7, 1939, Serial No. 255,161

6 Claims. (Cl. 62—4)

My invention relates to a defrosting system for refrigerating apparatus, and it is particularly useful on domestic refrigerators driven by electric motors.

Electric refrigerators are now available in which the electric motor which drives the compressor is controlled by an automatic switch responsive to the temperature of the refrigerating coil so that the motor runs periodically for different lengths of time to maintain a predetermined temperature within the refrigerating compartment. In certain refrigerators a manual control element is provided to vary the setting of the automatic switch and thereby vary the temperature which is maintained in the refrigerating compartment. Usually this manual control element has several positions for different temperatures, and the position for highest temperature is usually designated as the "defrost" position of the control. The control has one further position beyond the "defrost" known as the "off" position in which the manual control operates to hold the automatic switch open and thereby shut down the refrigerating apparatus.

In refrigerating apparatus of the type described above, in the "defrost" position of the temperature control element, the compressor motor runs less frequently and for shorter periods of time than in the other positions of the control. During the non-operating period, the frost on the refrigerating coil is supposed to melt or defrost, but experience has shown that the frost will melt from certain parts of the coil but not from others. For example, in certain types of refrigerating systems, the frost is melted from the upper part of the coil but not from the lower part. Furthermore, the water resulting from the melting of the frost on the upper part of the coil flows down and accumulates as ice on the lower part of the coil, and the accumulated ice causes difficulty in preventing the removal of the defrosting tray. Not only is the defrosting incomplete, but the time required for defrosting is too long.

An object of the present invention is to devise a control arrangement for refrigerators of the type described above in which the defrosting of the refrigerating coil may be accomplished in a short time. A further object is to provide arrangements for completely defrosting the coil and thus eliminating the difficulty of accumulated ice interfering with the removal of the defrosting tray. My invention further involves the provision of a pilot light which is energized during the defrosting period and serves as an indication of the defrosting condition. Further objects will appear from the following description of the invention:

The essential parts of my invention are illustrated in the accompanying drawing in which Figure 1 is a schematic diagram showing the compressor motor, the refrigerating coil and the automatic switch for controlling the compressor motor, the automatic switch being shown partly in section;

Figure 1a shows the position of the temperature control element in the defrost position;

Figure 1b shows the position of the temperature control element in the "off" position, and Figure 2 is a sectional view of the automatic switch taken along the line 2—2 of Figure 1.

Referring to the drawing, 1 indicates the compressor motor for driving the compressor (not shown), 2 indicates the refrigerating coil located in the refrigerating compartment of the refrigerator, and the defrosting tray located beneath the coil 2 is shown at 2a. Other well known elements of the refrigerating apparatus, such as the condenser, the expansion valve and the compressor have not been shown in the drawing, since showing of these elements is not essential to an understanding of my invention. The details of the automatic switch for maintaining constant temperature of the refrigerating coil are shown in the upper part of Figure 1. The switch shown in this figure is according to the construction supplied on refrigerators manufactured by the Westinghouse Electric and Manufacturing Company, certain parts of the switch being modified to embody my present invention.

The automatic switch has a box-like housing 3, the near wall of which has been cut away to illustrate the internal arrangement. At one end of the housing a pair of electric contacts 4a and 4b are mounted upon an insulating plate 3a, and a switch arm 5 pivoted to the opposite side walls of the housing carries at its outer end a switch contact 5a for bridging the contacts 4a and 4b. The switch arm 5 is operated by a spring 6 one end of which is attached to the arm 5 and the other end of which is attached to the free end of a link 7 which in turn is pivoted to the outer end of a lever 8. The right-end of lever 8 is secured to a spindle or rod 8a the ends of which are located in vertical slots formed in opposite side walls of the housing 3. A spring 9 having a screw 9a for adjusting the tension thereof is arranged to press the right-end of lever 8 downwardly and thereby cause the spindle 8a to rest upon a pair of cam elements 10a and 10b mounted upon a shaft 10c journaled in opposite walls of housing 3. An expansible bellows 11 is mounted beneath the lever 8 and is arranged to press upwardly on the lever 8 at a point to the left of the point of engagement of the spring 9. The bellows 11 is provided with a tube 11a filled with vaporizable fluid and arranged in heat transfer relation with the refrigerating coil 2 in such manner that the bellows 11 expands and contracts according to variation in temperature of the coil 2, as is well understood. The travel of the free end of link 7 is limited by a pair of stops 3b and 3c located upon an arm 3d depending from the top wall of the housing. A pair of similar stops located on the opposite edge of the arm 3d cooperate with the web 8b on lever 8 to limit the travel of the lever. An adjustable stop 5b is provided to limit the upward movement of the switch 5. Cam shaft 10c is provided with an operating knob 10d (Fig. 2) by which it is moved to different positions, and cams 10a and 10b are provided with a series of notches a, b, c, d, e, f and g, which serve as seats for shaft 10c in the various positions, the notch f corresponding to the "defrost" position while the notch g corresponds to the "off" position of the control. As will be seen, the cams serve to raise or lower the right end of lever 8, according to the position of the cam shaft. The construction of the automatic switch as described immediately above is already known, and, as heretofore employed, the switch opens and closes the circuit of the compressor motor at contacts 4a—4b according to the pressure existing in bellows 11. When the switch is closed, the motor is operating, and as soon as the temperature in the coil decreases to a certain value, the bellows 11 contracts so that the lever 8 is lowered to a position where the pivoted end of link 7 falls below the free end of the link, and the spring 6 will then operate the switch arm 5 into upper position and thereby open the motor circuit. As the temperature in the coil 2 rises, bellows 11 expands and when the pivoted end of link 7 rises above the free end of the link, the spring 6 causes the switch to close. Rotation of the cam shaft 10c causes raising or lowering of the pivoted end of lever 8, and it will be clear that raising of the pivot point causes the automatic switch to open at higher temperatures. Accordingly, notch a on cams 10a and 10b corresponds to the position for lowest temperature in the coil 2, and the remaining notches correspond to positions of higher temperature in the coil 2.

For carrying out the purposes of my invention, I form one of the cam elements (for example, cam 10a) of insulating material and I arrange a three-element leaf-spring switch to be operated by the cam 10a, the switch blades being shown at 12a, 12b and 12c. As shown in Figure 1, contact is normally maintained between blades 12a and 12b, but blades 12b and 12c are normally separated. The circuit for the compressor motor extends from terminal A of a source of current to switch blade 12b, through the switch contacts to blade 12a and then through the switch contacts 4a—4b, through the motor 1, and back to the opposite terminal B of the source of current. It will be noted that switch contacts 4a—4b and 12a—12b are connected in series in the motor circuit. For the purpose of insuring complete defrosting of the coil 2 and for reducing the time required for defrosting, I provide one or more electric heating coils 13a and 13b arranged in heat transfer relation with the refrigerating coil 2, and these coils are energized by a circuit extending from terminal B through the coils 13a and 13b, through a thermostatic switch 13c, through switch blades 12c—12b, and back to terminal A. The thermostatic switch 13c is provided to open the circuit of the heater elements when the temperature in the refrigerating compartment rises above a predetermined amount, for example, it opens the circuit when the temperature rises to 55 or 60 degrees Fahrenheit. A pilot light 14 is connected in shunt to the electric heater units 13a and 13b for indicating when the defrosting operation is in progress, and this lamp is positioned to be visible from outside the refrigerator.

As shown in Figure 1, the temperature control is in position e corresponding to the highest normal operating temperatures of the refrigerating coil 2. In this position, the switch contacts 12a—12b are closed, thus permitting normal operating of the automatic switch to control the motor, while switch contacts 12b—12c are open. When the temperature control is moved to position f corresponding to "defrost" position, the cam 10a engages switch blade 12b and interrupts contact between this blade and blade 12a and completes contact between blades 12b and 12c. This condition is illustrated in Figure 1a. Thus, in the "defrost" position the circuit to the compressor motor is interrupted by switch contacts 12a—12b and the circuit to the heater coils 13a and 13b is closed. Heat supplied from coils 13a and 13b insures rapid defrosting of the coil 2 and prevents accumulation of ice and frost on the lower part of the coil and thereby overcomes the difficulty heretofore experienced in removing the defrosting pan 2a. When the control is first moved to "defrost" position the automatic switch moves to open position, but, as the temperature in the refrigerating compartment rises, the switch will again close; however, switch contacts 12b—12c remain open and prevent starting of the motor. Upon completion of the defrosting, the temperature control is turned back to one of the normal positions if the refrigerator is to continue into operation.

When it is desired to discontinue operation of the refrigerator, the temperature control is moved to the position corresponding to notch g. In this position a lateral extension 10a' on cam 10a engages switch blade 12c and opens contact between this blade and blade 12b, thereby opening the circuit through heater coils 13a and 13b. Contact between blades 12a and 12b is also kept open by the cam 10a, and the position of the switch blades for the "off" position of the control is illustrated in Figure 1b. It will be understood that the extension 10a' on cam 10a is positioned to one side of the cam so as to avoid operating switch blades 12a and 12b but engages blade 12c. The end of the blade 12c is made broader than the blades 12a and 12b so that the extension 10a' engages an overhanging portion of the blade 12c (see Fig. 2).

From the foregoing it will be seen that I have devised a defrosting system in which a single manual control element is employed for changing the setting on the automatic switch to maintain different temperatures in the refrigerating compartment, and switching means is provided in one position of the control for disconnecting the motor and for connecting in defrosting coils, and additional switching means is provided in the "off" position of the control for disconnecting both the motor and the defrosting coils. While I have illustrated my invention as applied to a certain type of automatic switch, it will be understood that the invention may be applied to other types of automatic switch. It will also be apparent that the cam 10a may be formed of conducting material where switch blades 12b and 12c are provided with insulating tips. Other modifications may be made without departing from the principle of my invention.

What I claim is:

1. A defrosting system for an electrically driven refrigerator comprising in combination, refrigerating means, an electric motor for driving said refrigerating means, a switch for controlling the circuit to said motor, means responsive to the temperature of said refrigerating means for controlling said switch to maintain a substantially constant temperature of said refrigerating means, manual means for adjusting said temperature responsive means to vary the temperature to be maintained, and means controlled by said manual means in one position thereof for interrupting the circuit to said motor independently of said switch and temperature responsive means and for maintaining said motor circuit interrupted so long as said manual means remains in said one position.

2. In combination, refrigerating means, an electric motor for driving said refrigerating means, a switch for controlling the circuit to said motor, means responsive to the temperature of said refrigerating means for controlling said switch to maintain a substantially constant temperature of said refrigerating means, a second normally closed switch included in said motor circuit in series with the first switch, manual means for adjusting said temperature responsive means to vary the temperature to be maintained, and means operated by said manual means in one position thereof for opening said second switch.

3. In combination, refrigerating means, an electric motor for driving said refrigerating means, a switch for controlling the circuit to said motor, means responsive to the temperature of said refrigerating means for controlling said switch to maintain a substantially constant temperature of said refrigerating means, manual means for adjusting said temperature responsive means to vary the temperature to be maintained, electric heating means arranged in heat transfer relation to said refrigerating means, and means rendered operative in one position of said manual control means for energizing said electric heating means.

4. A combination according to claim 3, and including means operated by said manual means in another position thereof for deenergizing said electric heating means and for maintaining said switch in open position.

5. In combination, refrigerating means, an electric motor for driving said refrigerating means, a switch for controlling the circuit to said motor, means responsive to the temperature of said refrigerating means for controlling said switch to maintain a substantially constant temperature of said refrigerating means, a second normally closed switch included in said motor circuit in series with the first switch, manual means for adjusting said temperature responsive means to vary the temperature to be maintained, electric heating means arranged in heat transfer relation to said refrigerating means, and means operated by said manual means in one position thereof for opening said second switch and for energizing said electric heating means.

6. A combination according to claim 5, and including means rendered operative in another position of said manual means for maintaining said second switch in open position and for deenergizing said electric heating means.

CHARLES B. WILCOX.